US008942685B2

(12) United States Patent
Weksler et al.

(10) Patent No.: US 8,942,685 B2
(45) Date of Patent: Jan. 27, 2015

(54) CALLBACK OPTIONS VIA WIRELESS DEVICE

(71) Applicant: Lenovo (Singapore) Pte. Ltd., Singapore (SG)

(72) Inventors: Arnold S. Weksler, Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 3 days.

(21) Appl. No.: 13/913,799

(22) Filed: Jun. 10, 2013

(65) Prior Publication Data

US 2014/0364093 A1    Dec. 11, 2014

(51) Int. Cl.
*H04M 3/42* (2006.01)
*H04W 76/02* (2009.01)

(52) U.S. Cl.
CPC .................................. *H04W 76/028* (2013.01)
USPC .......................................................... 455/416

(58) Field of Classification Search
CPC    H04L 12/1831; H04M 3/42221; H04M 3/56; H04M 2203/305; H04M 2203/2088
USPC .......................................................... 455/416
See application file for complete search history.

(56) References Cited

U.S. PATENT DOCUMENTS

| 5,862,208 | A  | * | 1/1999  | MeLampy et al. ........ 379/212.01 |
| 2005/0233736 | A1 | * | 10/2005 | Berstis et al. ................. 455/416 |
| 2009/0143050 | A1 | * | 6/2009  | Ignatin ........................ 455/414.1 |
| 2012/0129519 | A1 | * | 5/2012  | Hinton ........................ 455/432.1 |
| 2014/0220954 | A1 | * | 8/2014  | Lee ................................ 455/418 |

* cited by examiner

*Primary Examiner* — Creighton Smith
(74) *Attorney, Agent, or Firm* — Schwegman Lundberg & Woessner, P.A.

(57) ABSTRACT

A communication device includes a transceiver configured to communicate with other communication devices over a cellular network, and circuitry coupled to the transceiver, the circuitry configured to detect a lost communication session with another communication device and generate a menu of options regarding the lost communication session.

20 Claims, 3 Drawing Sheets

CALLBACK OPTIONS VIA WIRELESS DEVICE

BACKGROUND

Cell phone conversations are prone to abrupt disconnections. When the call is disconnected, both parties are left in a state of not knowing if the other party was done with the conversation.

One party can call the other party back, but there are multiple problems with that. Both parties could try to call each other at the same time, resulting in having to call yet again. Both parties may wait for the other party to call them back. Alternatively, the user could type a text to tell the other party they were done with the conversation.

SUMMARY

A communication device includes a transceiver configured to communicate with other communication devices over a cellular network, and circuitry coupled to the transceiver, the circuitry configured to detect a lost communication session with another communication device and generate a menu of options regarding the lost communication session.

A method includes detecting a lost voice communication session between a wireless voice communication device and a further communication device, generating a menu of choices regarding the lost communication session, receiving a user selection of one of the choices on the menu, and executing the user selection on the wireless voice communication device.

A computer readable storage device having instructions to cause a computer to perform a method, the method including detecting a lost voice communication session between a wireless voice communication device and a further communication device, generating a menu of choices regarding the lost communication session, receiving a user selection of one of the choices on the menu, and executing the user selection on the wireless voice communication device.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
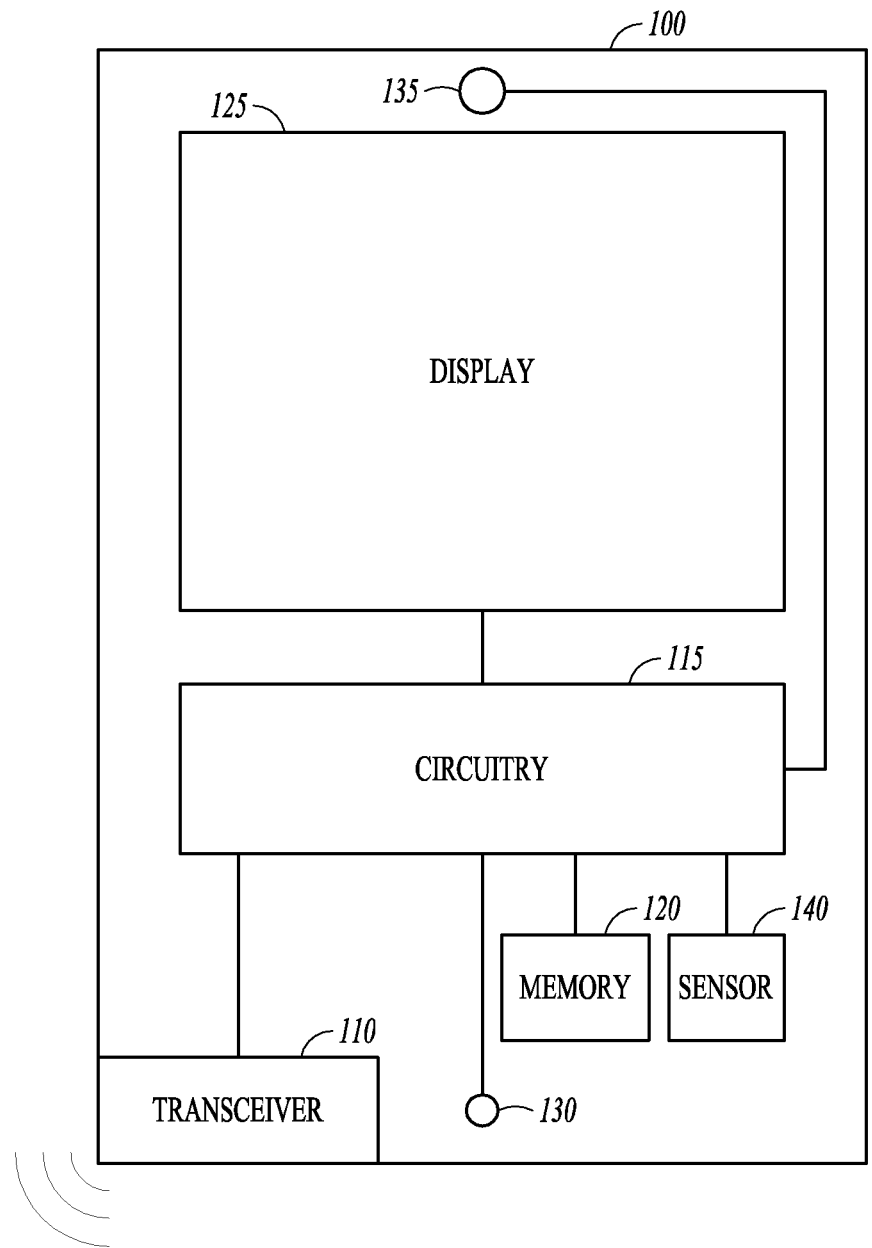
FIG. 1 is a block diagram of a communication device according to an example embodiment.

An example wireless device is illustrated in block form at 100 in FIG. 1. In various embodiments, the wireless device may a mobile device, such as a cellular phone, touchpad, or other communication device capable of communicating with other devices via a communication session, also referred to as a call. Device 100 includes a transceiver 110 such as a cellular transceiver to establish and maintain communication sessions. The transceiver 110 is coupled to circuitry 115, which may include a processor coupled to a memory 120 to store programming for execution on the processor. Circuitry 115 is also coupled to display 125, which may be a touchscreen in one embodiment to accept user touches and display information generated by circuitry 115. Circuitry 115 may also be coupled to a microphone 130, speaker 135 and one or more sensors 140 such as an accelerometer to detect gestures such as moving a phone away from a user's mouth and ear indicating that a conversation is completed.

When a mobile device call (communication session) between two or more parties is prematurely terminated, several options may be automatically displayed to the user via display 125 in one embodiment. The options may include an option to automatically reconnect the call, referred to as Auto-reconnect, an option to send one of the parties a list of predefined text messages (or custom voice text message), and an option to ignore the disconnection.

In one embodiment, the transceiver and circuitry detect that a call has been dropped without the user having selected an option to end the call. The display of a menu of options may triggered in a number of ways. In one embodiment, a user did not end the call intentionally (e.g. by pressing end call). In a further embodiment, a user continues talking after a call is terminated. The microphone 130 may still be active to facilitate detection by circuitry 115, and in combination with detecting that the call has been dropped, my automatically initiate reconnection, or provide the user the option to reconnect in a menu. In a further embodiment, a gesture at the end of the call as detected by sensor 140, may be indicative of ending the call. Another such gesture may be a swipe of a finger across the display.

For auto-reconnect, a mechanism synchronizes which caller will place the reconnect call from their device. In one embodiment, the device which originated the original call is nominally selected to attempt to reconnect the call. In a further embodiment, a handshake may occur at or near the beginning of the call to determine which mobile device takes priority when placing the reconnection call. The negotiation may result in a token being given to one of the devices which is selected to reconnect the call. Upon a call being dropped, and optionally if a user selects a reconnect option, the device with the token will reinitiate the call. In further embodiments, the device with the token may reinitiate dropped calls without user interaction. In such an embodiment, the device may also detect a gesture or attempt to end the call, and then provide the user the option of whether or not to reconnect.

The display of options above may be triggered in a number of ways once the transceiver 110 detects that a call has been dropped and notifies the circuitry 115 of the dropped call. The display may be triggered when a user did not end the call intentionally (e.g. by pressing end call), the user continues talking after a call is terminated as detected by the microphone and circuitry, and a gesture at the end of the call indicative of a user intending to end the call. Such a gesture may be detected via sensor 140, or via user interaction with display 125.

Figure 2:
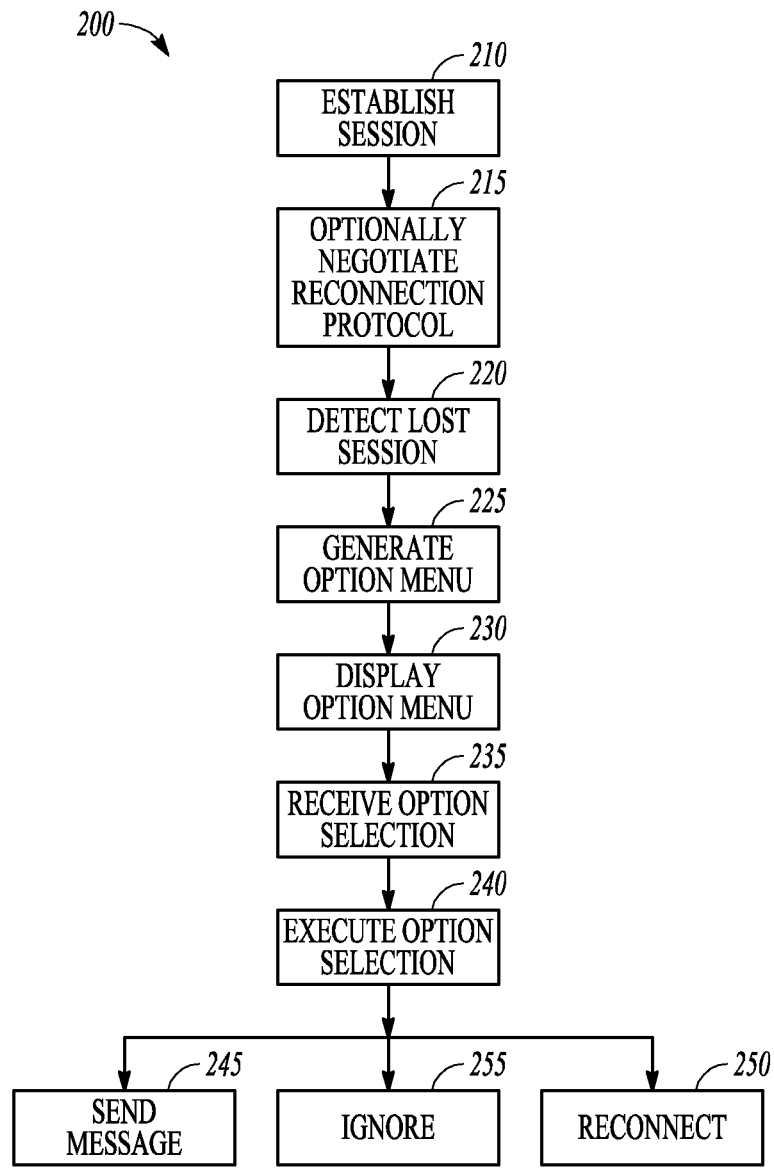
FIG. 2 is a flowchart illustrating a method of reconnecting a call by a wireless communication device according to an example embodiment.

FIG. 2 is a flowchart illustrating a method 200 of reconnecting a dropped call. The method 200 may be implemented via code in a device operating system or an application. If both devices on a call have the code, they may negotiate which device will originate a return call. If only one device has the code, that device will automatically reinitiate the call. This may occur for example when a cell phone has a communication session with a non-mobile device or a mobile device without the code.

In method 200, a session is established at 210 by an originating device. At 215, the devices may optionally negotiate using a reconnection protocol. The protocol may involve the device initiating being selected as the originator of the reconnection. The devices may also pass a token between themselves, with the holder of the token being the device to attempt reconnection. In further embodiments, the devices may communicate signal levels each device is experiencing, and the device with the lowest signal level may retain the token, and initiate reconnection when signal levels return to an acceptable level.

At 220, the session is detected as being lost. The loss of the session may be due to one of the devices moving to an area where the cellular signal was below acceptable levels, such as in a tunnel. Loss of battery power or other malfunction of the device may also trigger loss of the session. At 225, an option menu is generated as indicated above, and the option menu is displayed at 230. An option selection is received at 235 and executed at 240. The options are indicated as send a message 245, ignoring the disconnection at 255, and reconnecting at 250.

Selecting the message option at 245 results in either a message being sent automatically, or a further menu of messages including text or voice indicative of the user not intending to call back, dropped signal—will call back when I can, and done anyway—give me a call if you have more to discuss. In various embodiments, the text message will remain queued until the device is able to send the message. When the signal level increases or the battery is recharged sufficiently, the message will be sent.

Figure 3:
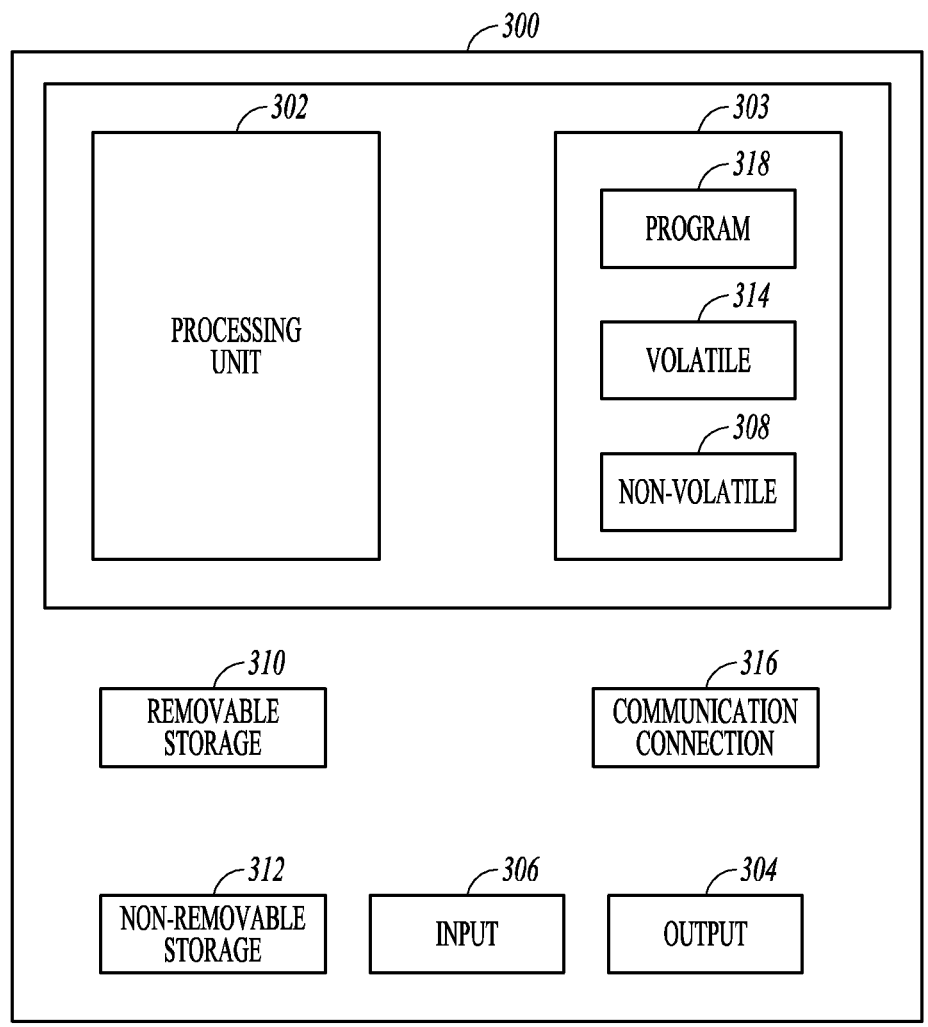
FIG. 3 is an example computer system for implementing one or more methods according to an example embodiment.

FIG. 3 is a block diagram of a computing device, according to an example embodiment. In one embodiment, the computing device may be cellular phone or other mobile device such as a tablet, or any other device capable of communicating wirelessly. One example computing device in the form of a computer 300, may include a processing unit 302, memory 303, removable storage 310, and non-removable storage 312. Although the example computing device is illustrated and described as computer 300, the computing device may be in different forms in different embodiments and need not include all the components described, such as disk based storage devices. For example, the computing device may instead be a smartphone, a tablet, or other computing device including the same or similar elements as illustrated and described with regard to FIG. 3. Further, although the various data storage elements are illustrated as part of the computer 300, the storage may also or alternatively include cloud-based storage accessible via a network, such as the Internet.

Returning to the computer 300, memory 303 may include volatile memory 314 and non-volatile memory 308. Computer 300 may include—or have access to a computing environment that includes a variety of computer-readable media, such as volatile memory 314 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 300 may include or have access to a computing environment that includes input 306, output 304, and a communication connection 316. The input 306 may include one or more of a touchscreen, touchpad, mouse, keyboard, camera, and other input devices. The computer may operate in a networked environment using a communication connection 316 to connect to one or more remote computers, such as database servers, web servers, and other computing devices. An example remote computer may include a personal computer (PC), server, router, network PC, a peer device or other common network node, or the like. The communication connection 316 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 302 of the computer 300. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

EXAMPLES

Example 1

A communication device comprising:
a transceiver configured to communicate with other communication devices over a cellular network; and
circuitry coupled to the transceiver, the circuitry configured to detect a lost communication session with another communication device and generate a menu of options regarding the lost communication session.

Example 2

The communication device of example 1 and further comprising a touch screen display to display the menu of options and receive a user selection of an option.

Example 3

The communication device of example 2 wherein the menu of options includes an option to automatically reconnect.

Example 4

The communication device of example 3 wherein the circuitry is further configured to reconnect the lost communication session responsive to receiving a user selection of the option to automatically reconnect.

Example 5

The communication device of example 4 wherein the circuitry is configured to determine which device is to initiate the reconnection of the lost communication session.

Example 6

The communication device of example 5 wherein the circuitry is configured to negotiate possession of a token to determine which device is to initiate the reconnection of the lost communication session.

Example 7

The communication device of any of examples 2-6 wherein the list of options includes selecting from a list of messages to send to the other device.

Example 8

The communication device of example 7 wherein the list of messages includes messages conveying that a signal has been lost and the user will initiate a connection when the signal returns, and that the communications were completed and that the other device should initiate a return session if desired.

Example 9

The communication device of example 8 wherein the list of messages further includes a message that conveys a session will not be reinitiated.

Example 10

The communication device of any of examples 1-9 and further comprising a microphone coupled to the circuitry, wherein the circuitry to detect a lost communication session is further configured to detect via the microphone if a person continues talking after the session is lost.

Example 11

The communication device of any of examples 1-10 and further comprising a sensor coupled to the circuitry to provide detection of a gesture to the circuitry indicative of ending a communication session.

Example 12

A method comprising:
detecting a lost voice communication session between a wireless voice communication device and a further communication device;
generating a menu of choices regarding the lost communication session;
receiving a user selection of one of the choices on the menu; and
executing the user selection on the wireless voice communication device.

Example 13

The method of example 12 wherein the menu of choices is displayed on a touchscreen of the wireless voice communication device.

Example 14

The method of example 13 wherein the menu of options includes an option to automatically reconnect the lost communication session.

Example 15

The method of example 14 and further comprising determining which device is to initiate the reconnection of the lost communication session.

Example 16

The method of example 15 and further comprising negotiating possession of a token to determine which device is to initiate the reconnection of the lost communication session during the communication session.

Example 17

The method of any of examples 13-17 wherein the list of options includes selecting from a list of messages to send to the other device, the list of messages including messages conveying that a signal has been lost and the user will initiate a connection when the signal returns, and that the communications were completed and that the other device should initiate a return session if desired.

Example 18

The method of any of examples 13-17 and further comprising detecting via a microphone if a person continues talking after the session is lost.

Example 19

A computer readable storage device having instructions to cause a computer to perform a method, the method comprising:
detecting a lost voice communication session between a wireless voice communication device and a further communication device;
generating a menu of choices regarding the lost communication session;
receiving a user selection of one of the choices on the menu; and
executing the user selection on the wireless voice communication device.

Example 20

The computer readable storage device of example 19 wherein the method further comprises:
displaying the menu of choices on a touchscreen of the wireless voice communication device, and wherein the menu includes an option to automatically reconnect the lost communication session, an option including a list of messages to send to the other device, the list of messages including messages conveying that a signal has been lost and the user will initiate a connection when the signal returns, and that the communications were completed and that the other device should initiate a return session if desired.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A communication device comprising:
   a transceiver that communicates with other communication devices over a cellular network;
   circuitry coupled to the transceiver, wherein the circuitry detects a lost communication session with another communication device and generate a menu of options regarding the lost communication session, and
   a microphone coupled to the circuitry, wherein the circuitry to detect a lost communication session further detects via the microphone if a person continues talking after the session is lost.

2. The communication device of claim 1 and further comprising a touch screen display to display the menu of options and receive a user selection of an option.

3. The communication device of claim 2 wherein the menu of options includes an option to automatically reconnect.

4. The communication device of claim 3 wherein the circuitry further reconnects the lost communication session responsive to receiving a user selection of the option to automatically reconnect.

5. The communication device of claim 4 wherein the circuitry determines which device is to initiate the reconnection of the lost communication session.

6. The communication device of claim 5 wherein the circuitry negotiates possession of a token to determine which device is to initiate the reconnection of the lost communication session.

7. The communication device of claim 2 wherein the list of options includes selecting from a list of messages to send to the other device.

8. The communication device of claim 7 wherein the list of messages includes messages conveying that a signal has been lost and the user will initiate a connection when the signal returns, and that the communications were completed and that the other device should initiate a return session if desired.

9. The communication device of claim 8 wherein the list of messages further includes a message that conveys a session will not be reinitiated.

10. The communication device of claim 1 wherein the circuitry further reconnects the lost communication session responsive to detection of the person continuing to talk after the session is lost.

11. The communication device of claim 1 and further comprising a sensor coupled to the circuitry to provide detection of a gesture to the circuitry indicative of ending a communication session.

12. A method comprising:
    detecting a lost voice communication session between a wireless voice communication device and a further communication device;
    generating a menu of choices regarding the lost communication session;
    receiving a user selection of one of the choices on the menu;
    executing the user selection on the wireless voice communication device; and
    detecting via a microphone if a person continues talking after the session is lost.

13. The method of claim 12 wherein the menu of choices is displayed on a touchscreen of the wireless voice communication device.

14. The method of claim 13 wherein the menu of options includes an option to automatically reconnect the lost communication session.

15. The method of claim 14 and further comprising determining which device is to initiate the reconnection of the lost communication session.

16. The method of claim 15 and further comprising negotiating possession of a token to determine which device is to initiate the reconnection of the lost communication session during the communication session.

17. The method of claim 13 wherein the list of options includes selecting from a list of messages to send to the other device, the list of messages including messages conveying that a signal has been lost and the user will initiate a connection when the signal returns, and that the communications were completed and that the other device should initiate a return session if desired.

18. The method of claim 13 and further comprising automatically recommencting the call responsive to detecting that the person continues talking after the session is lost.

19. A computer readable storage device having instructions to cause a computer to perform a method, the method comprising:
    detecting a lost voice communication session between a wireless voice communication device and a further communication device;
    generating a menu of choices regarding the lost communication session;
    receiving a user selection of one of the choices on the menu; and
    executing the user selection on the wireless voice communication device; and
    detecting via a microphone if a person continues talking after the session is lost.

20. The computer readable storage device of claim 19 wherein the method further comprises:
    displaying the menu of choices on a touchscreen of the wireless voice communication device, and wherein the menu includes an option to automatically reconnect the lost communication session, an option including a list of messages to send to the other device, the list of messages including messages conveying that a signal has been lost and the user will initiate a connection when the signal returns, and that the communications were completed and that the other device should initiate a return session if desired.

* * * * *